United States Patent [19]

Fauteux et al.

[11] Patent Number: 5,503,946
[45] Date of Patent: Apr. 2, 1996

[54] PARTICULATE INTERFACE FOR ELECTROLYTIC CELLS AND ELECTROLYTIC PROCESS

[75] Inventors: Denis G. Fauteux, Acton; Jie Shi, Arlington; Richard Gary, Everett, all of Mass.

[73] Assignee: Arthur D. Little, Inc., Cambridge, Mass.

[21] Appl. No.: 314,878

[22] Filed: Sep. 29, 1994

[51] Int. Cl.⁶ .................................................. H04M 4/62
[52] U.S. Cl. ........................ 429/50; 429/232; 29/623.5; 427/122; 205/59
[58] Field of Search ...................... 429/50, 137, 232, 429/212; 29/623.5; 205/59; 427/122

[56] References Cited

U.S. PATENT DOCUMENTS

| | | | |
|---|---|---|---|
| 5,166,008 | 11/1992 | Tomida et al. | 429/137 |
| 5,342,710 | 8/1994 | Koksbang | 429/192 |
| 5,366,829 | 11/1994 | Saidi | 429/212 |
| 5,387,479 | 2/1995 | Koksbang | 429/212 X |

OTHER PUBLICATIONS

U.S. Patent Application Serial No. 08/290,017 filed on Aug. 12, 1994 entitled "Electrolytic Cell and Electrolytic Process," invented by Denis G. Fauteux et al., and, assigned to Arthur D. Little, Inc. (assignee of the present application).

Primary Examiner—Stephen Kalafut
Attorney, Agent, or Firm—Dick and Harris

[57] ABSTRACT

An electrolytic cell and electrolytic process wherein the cell includes a metal anode, such as a lithium anode, a cathode and an electrolyte. The surface of the anode is treated with a substantially non-continuous electronically conductive particulate coating, wherein the particulate may consist of carbon. This non-continuously applied particulate coating not only provokes the formation of a stable passivating layer (toward suppression of dendritic growth), but it also serves to lower and substantially sustain interfacial resistance at the surface of the anode during the life of the cell.

21 Claims, 1 Drawing Sheet

PARTICULATE INTERFACE FOR ELECTROLYTIC CELLS AND ELECTROLYTIC PROCESS

BACKGROUND OF THE INVENTION

1. Field of the Invention

This present invention relates in general to secondary cells and, more particularly, to an electrolytic cell and electrolytic process associated therewith, wherein the interfacial resistance of the working electrode is substantially lowered and sustained over the life of the electrolytic cell.

2. Background Art

Rechargeable, or secondary electrolytic cells, have been known in the art for many, many years. Furthermore, secondary cells constructed with lithium anodes have likewise been known in the art. Although such rechargeable lithium batteries have proven to be functional, many of such batteries have been undesirable from a practicle standpoint due to one, or both, of the following shortcomings: 1) the cycle life of such lithium batteries are relatively short (compared to other types of secondary cells, such as nickel-cadmium) due to the formation of dendritic growth on the lithium electrode during electrodeposition; and/or 2) the inability to effectively lower and substantially sustain the interfacial resistance at the lithium anode during the life of the rechargeable lithium battery.

With respect to suppression of dendritic growth, various approaches have been disclosed, including, but not limited to 1) the use of a copolymer layer applied to the surface of the lithium anode—wherein the copolymer layer is ionically conductive, electronically conductive when in contact with the lithium anode and which enables chemical equilibrium between the copolymer layer itself and the lithium anode (details relevant to such a layer can be found in U.S. Pat. No. 5,434,021); as well as 2) applying a continuous coating of an electronically conductive layer, such as graphite, to the surface of the lithium anode.

While such continuous electronically conductive layers have contributed to the suppression of dendritic growth—through their ability to provoke the formation of a substantially stable passivating layer at the anode—such continuous layers have also been responsible for lowering the cell's voltage, and, in turn, have shown little, if any, effect on lowering and sustaining interfacial resistance at the anode (when compared to anodes without such a layer). Indeed, when such a "continuous" layer is applied, the ions (associated with the anode, such as lithium ions which have passed into the electrolyte) chemically interact with the layer during, for example, reduction, wherein such an interaction chemically alters the composition of the electrode. For example, if the electrode is a lithium anode, and the layer is composed of carbon, the electrode will be altered during electrodeposition to an electrode composed of carbon and lithium ($LiC_6$)—thereby lowering the cells voltage relative to the voltage when the lithium electrode is substantially unaltered during electrodeposition. As another example, if the electrode is a lithium anode and the layer is composed of aluminum, the electrode will be altered during electrodeposition to an electrode composed of lithium/aluminum alloy (LiAl), thereby lowering the cells voltage relative to the voltage when the lithium electrode is substantially unaltered during electrodeposition.

Furthermore, when such a continuous electronically conductive particulate is applied to an anode, the layer is typically comprised of a highly crystalline material, such as graphite, as opposed to a non-crystalline material, such as carbon black. Indeed, such a highly crystalline graphite layer has proven necessary, when applied in a continuous orientation on the surface of the anode, for purposes of enabling the particular ions from the electrode to pass through the continuous carbon layer during oxidation and reduction.

SUMMARY OF THE INVENTION

The present invention comprises an electrolytic cell (or rechargeable battery) having two electrodes and an electrolyte, wherein one of the two electrodes includes an anode having a surface associated with the electrolyte. The invention further comprises means for substantially minimizing and sustaining interfacial resistance of the anode during the life of the electrolytic cell. The interfacial resistance means comprises an electronically conductive particulate coating applied to at least a portion of the surface of the anode in a non-continuous orientation.

In a preferred embodiment of the invention, the electronically conductive particulate coating includes carbon, such as graphite, carbon black or carbon from pryolysis of poly-(para-phenylene), however, other electronically conductive particulates, such as Mg powder, among others, is also contemplated. In addition, it is also contemplated that the anode be constructed from lithium—although other alkali metal constructions are likewise contemplated.

In this preferred embodiment of the invention, the electrolytic cell further comprises means to substantially suppress dendritic growth at the anode during electrodeposition. Such means may comprise a substantially stable passivating layer associated with the anode.

In another preferred embodiment of the invention, the means to substantially suppress dendritic growth includes a surface layer applied to the anode. The surface layer includes a copolymer which enables transfer of ions from the anode to the electrolyte and back into contact with the electrode, and, which is electronically conductive when it is in contact with the electrode. In addition, the copolymer further includes means for substantially obtaining chemical equilibrium between the surface layer and the electrode.

In another preferred embodiment, the electrolytic cell comprises two electrodes and an electrolyte wherein one of the electrodes includes an anode having a surface associated with the electrolyte, and, means for provoking formation of a substantially stable passivating layer at the surface of the anode so as to substantially prevent further passivation of the anode, and, in turn, to substantially suppress dendritic growth at the electrode during electrodeposition. The stable passivating layer provoking means includes an electronically conductive particulate coating associated with at least a portion of the surface of the anode in a non-continuous orientation.

The present invention further comprises an electrolytic process comprising the steps of: a) connecting two electrodes separated and positioned within an electrolyte, wherein at least one of the two electrodes is an anode substantially constructed from an alkali metal, and, wherein the anode has a surface treated with an electronically conductive non-continuous particulate coating; b) ionizing metal atoms from the alkali metal anode to provide alkali metal ions; c) transferring ions from the alkali metal anode substantially through interrupted portions of the non-continuous particulate coating to the electrolyte so as to substantially preclude chemical alteration of the alkali metal anode to an electrode which comprises the alkali metal and the substance of the particulate layer which would otherwise result during electrodeposition, to, in turn, substantially minimize (lower) and sustain low interfacial resistance during the life of the electrolytic cell.

In a preferred embodiment, the electrolytic process further includes the step of provoking formation of a substantially stable passivating layer to prevent further passivation at the anode, and, in turn, to substantially suppress dendritic growth at the electrode during electrodeposition.

The present invention additionally comprises a process for constructing an electrolytic cell comprising the steps of: a) applying an electronically conductive non-continuous particulate coating onto an electrode; b) connecting the coated electrode to another electrode and separating both of the electrodes within an electrolyte; and c) forming a stable passivating layer at the anode.

The process further includes the step of applying a surface layer onto the electrode treated with the electronically conductive non-continuous particulate coating wherein such a surface layer is both ionically conductive and electronically conductive when in contact with the electrode. In this preferred process, the surface layer further comprises means for enabling chemical equilibrium between the surface layer and the electrode to which it is applied.

DETAILED DESCRIPTION OF THE DRAWINGS

Figure 1:
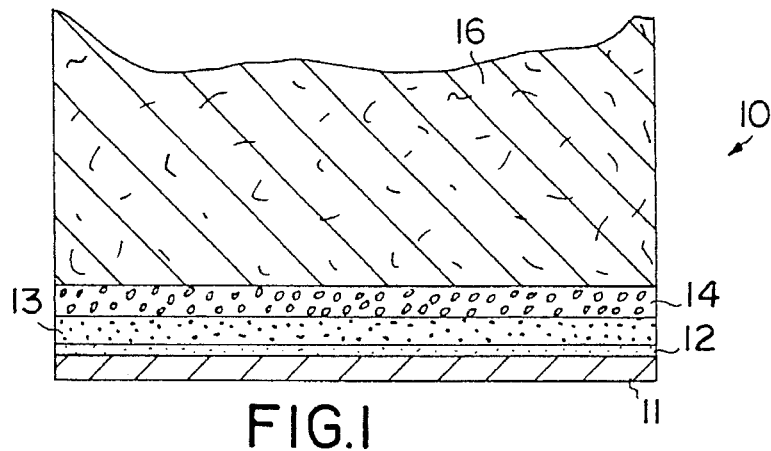
FIG. 1 is a diagram of a prior art electrolytic cell in section.

While this invention is susceptible of embodiment in many different forms, there is shown in the drawings and will herein be described in detail, two specific embodiments with the understanding that the present disclosure is to be considered as an exemplification of the principles of the invention and is not intended to limit the invention to the embodiments illustrated.

A sectional view of a prior art electrolytic cell 10 is shown in FIG. 1 as including alkali metal anode 11, native passive layer 12, passivating layer 12 electrolyte 16, and carbon coating 13, which is applied to the surface of anode 11 in a continuous (non-interrupted) orientation. It should be noted that the continuously applied coating is constructed from highly organized carbon, such as graphite, inasmuch as non-organized carbon, such as carbon black, will not enable operable ionic conductivity from the anode toward and into electrolyte 16.

Furthermore, in such a prior art construction, the particular alkali metal ions of the anode, such as lithium ions, will chemically interact with the carbon (e.g. graphite). This interaction will then result in the chemical alteration of the alkali metal electrode to one having carbon as part of its composition. For example, if the electrode was originally constructed from lithium, it will become chemically altered to a carbon/lithium electrode—thereby resulting in a voltage drop in the electrolytic cell due to the thermal dynamic potential of such an "altered" electrode when compared against, for example, an "unaltered" lithium electrode.

Figure 2:
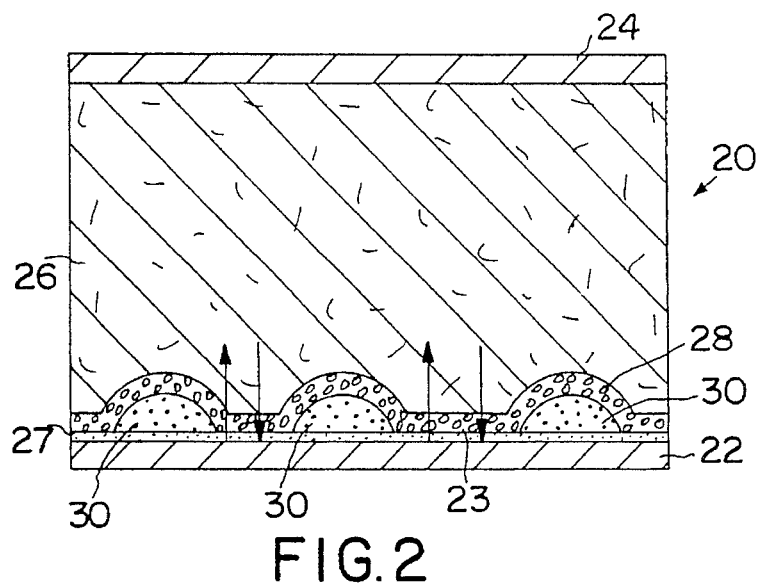
FIG. 2 is a diagram of one preferred embodiment of the present electrolytic cell.

The present electrolytic cell 20 (which, in a preferred embodiment, comprises a rechargeable battery) is shown in FIG. 2 as comprising anode 22 (having a surface 23), cathode 24, electrolyte 26, native passive layer 27, substantially stable passivating layer 28 and substantially non-continuous electronically conductive particulate coating 30. Although anode 22 will be described as being substantially constructed from lithium, it is contemplated that the anode be constructed from other alkali metals as well. In addition, for purposes of the present disclosure, and as understood by those in the art, native passive layer 27 will be considered as comprising part of surface 23 of anode 22 inasmuch as such a native passive layer typically results during construction of the anode itself.

As will be discussed in greater detail, it is contemplated that electrolyte 26 consist of a liquid or solid electrolyte. Although detail will be provided on utilization of both a liquid electrolyte composed of 1.0M $LiClO_4$ in propylene carbonate (PC), as well as a solid/gel electrolyte based on PC-acrylates-$LiAsF_6$, it will be recognized to those with ordinary skill in the art that other liquid and solid electrolytes can be used relative to the particular electrode construction.

As will be explained, the non-continuously applied electronically conductive particulate coating 30 on surface 23 of anode 22 performs a dual function: 1) it serves as the means for lowering and substantially sustaining a relatively low interfacial resistance at the anode during the life of the cell; and 2) it serves as the means for provoking the formation of substantially stable passivating layer 28. This substantially stabilized passivating layer then serves as the means to substantially suppress dendritic growth at anode 22 during electrodeposition.

Although substantially non-continuous electronically conductive particulate coating 30 is shown in FIG. 2 (as well as FIG. 3) as comprising carbon, it should be noted that other particulates are likewise contemplated— provided they are "electronically conductive" and, are applied to the surface of the anode in a substantially "non-continuous" (interrupted) orientation. Furthermore, it is contemplated that both highly organized carbon, such as graphite, as well as non-organized carbon, such as carbon black, among others, will likewise be effectively utilized.

Figure 3:
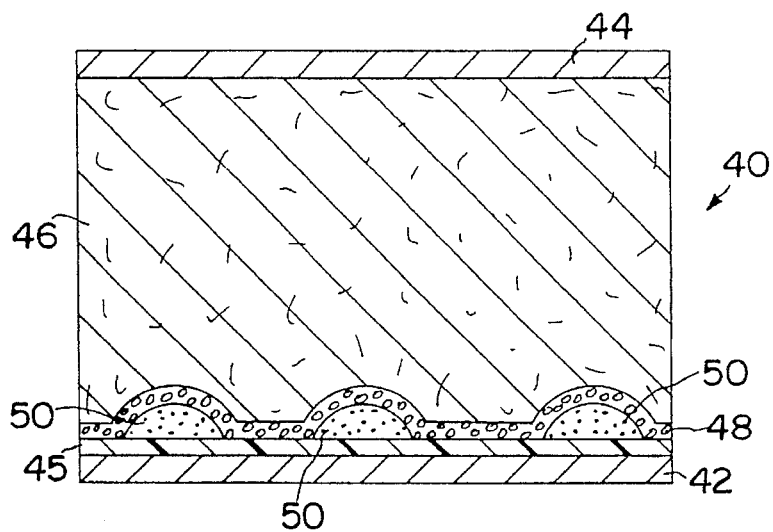
FIG. 3 is another preferred embodiment of the present electrolytic cell.

Another preferred embodiment of electrolytic cell 40 is shown in FIG. 3 as including alkali metal anode 42, cathode 44, surface layer 45, electrolyte 46, substantially stable passivating layer 48 and substantially non-continuous electronically conductive particulate coating 50. Surface layer 45, which, in association with substantially stable passivating layer 48, further aides in the suppression of dendritic growth at the surface of anode 42. Surface layer 45 includes a copolymer which enables transfer of ions from anode 42 to electrolyte 46 and back into contact with the electrode, and, which is electronically conductive when it is in contact with the electrode. In addition, surface layer 45 further includes means for substantially obtaining chemical equilibrium between the surface layer and the electrode. The particular copolymer of surface layer 45 may include polyvinylnaphthalene and polyethylene oxide. Indeed, such a copolymer will exhibit ionic conductivity as a result of the polyethylene oxide, electronic conductivity due to the formation of naphthalene radical anions upon contact of the polyvinylnaphthalene with anode 42, and, chemical equilibrium between surface layer 45 and anode 42.

Although surface layer 45 has been described as including polyvinylnaphthalene and polyethylene oxide, it will be understood that other compounds which exhibit both ionic and electronic conductivity are also contemplated for use. For example, other polynuclear aromatic structures (other than naphthalene) may be used for achieving the formation of radical anions upon contact with surface layer 45 of anode 42—toward obtaining the necessary electronic conductivity at the electrode/electrolyte interface. Actual operation, and the process associated with such a surface layer is explained in U.S. Pat. No. 5,434,021, entitled Electrolytic Cell and Electrolytic Process.

The electrolytic process (which will be explained with respect to a rechargeable battery) relative to electrolytic cell 20 of FIG. 2, comprises connecting two electrodes 22 and 24 which are separated and positioned within electrolyte 26. In the preferred embodiment, anode 22 is constructed from lithium and the electrolyte may be in liquid or solid form. Surface 23 of anode 22, is coated with electronically conductive particulate 30 in a substantially non-continuous orientation. The particulate (which, in a preferred embodiment, comprises carbon), may be applied to surface 23 of anode 22 by various methods—provided the method of treatment results in a substantially non-continuous (interrupted) coating on the anode surface. For example, the particulate may be applied by wet spraying, rolling and/or electro-static spraying techniques, to name a few.

As previously explained, after substantially non-continuous electronically conductive particulate coating 30 has been applied to anode 22, and after interfacing the coated anode with electrolyte 26, the non-continuously applied coating will provoke formation of substantially stable passivating layer 28. This stable layer will, accordingly, serve to prevent further passivation at the anode, and, in turn, substantially suppress dendritic growth at the anode during electrodeposition.

During, as well as after, formation of stable passivating layer 28, substantially non-continuously applied electronically conductive particulate coating 30 will enable transfer of ions, such as lithium ions, from lithium anode 22, to pass primarily through the interrupted portions of the coating during oxidation, and reduction (as shown by the direction of the arrows in FIG. 2). Accordingly, during reduction, the lithium ions will be substantially precluded from forming with the particulate (e.g. carbon) ions, which would otherwise result if the coating was continuous, as opposed to non-continuous. Indeed, if the particulate was "continuously" applied to the surface of lithium anode 22, the lithium ions (which have passed into the electrolyte) would chemically react with the carbon ions of the particulate during, for example, reduction. As a result, the lithium electrode would become altered during electrodeposition to an electrode composed of carbon and lithium—thereby lowering the cells voltage relative to the voltage when the lithium electrode is substantially unaltered during electrodeposition. Accordingly, the application of substantially "non-continuous" electronically conductive coating 30 at anode 22 will serve to maintain cell voltage, as well as serve to lower and substantially sustain interfacial resistance at anode 22 (relative to continuously coated and non-coated anodes) during the life of electrolytic cell 20.

In support of the process and the above-identified exhibited characteristics of the electrolytic cell, and, more particularly, the effects of the applied non-continuous electronically conductive particulate coating relative to its ability to lower and substantially sustain interfacial resistance at anode 22 during the life of the cell, several experiments were undertaken (using various electronically conductive particulates and electrolytes). Ten of such experiments, and their results, are outlined hereinbelow.

At the outset, it should be noted that Experiment Nos. 1 through 7 utilized an electrolytic cell having the following common characteristics:

a piece of metallic lithium foil with a thickness of 50 μm as the working electrode with an area of 2.54 $cm^2$;

a lithium reference electrode;

a glass fiber separator; and a lithium counter electrode.

Furthermore, in Experiment Nos. 1 through 3, the electrolyte comprised 1M $LiClO_4$ in a mixture of ethylene carbonate and dimethyl carbonate with a molar ratio of 3:2; in Experiment Nos. 4 through 7, the electrolyte comprised 1M $LiClO_4$ in propolylene carbonate; while in Experiment Nos. 8 through 10, the electrolyte was a gel based on PC-acrylate-$LiAsF_6$.

EXPERIMENT NO. 1

In this experiment, the working electrode was not treated with any type of electronically conductive particulate surface. The difference between the working electrode and the reference electrode voltage was measured to be less than 5 mV. A cathodic current of 0.2 mA was then applied to the electrolytic cell for 60 minutes using a Solartron Electrochemical Interface 1286. The interfacial resistance of the lithium working electrode was then monitored by AC impedance spectroscopy, which was carried out in a typical frequency range of 65 k–0.05 Hz using a Solartron Frequency Response Analyzer 1250 connected to an Electrochemical Interface 1286. The change of interfacial resistance of this untreated working electrode, over a period of time, was observed and then recorded in Table I (hereinbelow) under the column identified as "Non-treated Li."

TABLE I

In the mixture solvent of ethylene carbonate and dimethyl carbonate (molar ratio of 3:2) with 1 M $LiClO_4$ salt

| | Ratio of the Interfacial Resistance (Interfacial Resistance/the Initial Interfacial Resistance of Lithium) | | |
|---|---|---|---|
| Aging Time/hr | Non-treated Li | Li coating with carbon from Pryolysis of PPP | Li coated with IBA graphite |
| 0 | 1 | 1.29 | 1.33 |
| 6 | 1.97 | 1.57 | |
| 16 | 2.32 | 1.61 | 3.95 |
| 24 | 2.44 | 1.65 | 3.95 |
| 48 | 3.28 | 2.03 | 4.33 |

TABLE I-continued

In the mixture solvent of ethylene carbonate and dimethyl carbonate
(molar ratio of 3:2) with 1 M LiClO$_4$ salt Ratio of the Interfacial Resistance
(Interfacial Resistance/the Initial Interfacial Resistance of Lithium)

| Aging Time/hr | Non-treated Li | Li coating with carbon from Pryolysis of PPP | Li coated with IBA graphite |
|---|---|---|---|
| 72 | 3.91 | 7.17 | |
| 96 | 4.17 | 2.52 | |

EXPERIMENT NO. 2

In Experiment No. 2, the surface of the working electrode was treated with carbon powder obtained from pyrolysis of poly(paraphenylene) (also known as "PPP") in hydrogen at 700° C. This carbon powder was dispersed on the surface of the working electrode followed by rolling, to, in turn, result in the surface having a substantially "non-continuous" carbon coating. The potential difference between the working electrode and the reference electrode was measured at less than 20 mV. The working electrode was also cathodically treated with a 0.2 mA current. The change of the interfacial resistance of the non-continuously coated surface, over a period of time, was observed and then recorded in Table I (hereinabove) under the column identified as "Li Coating with carbon from Pyrolysis of PPP."

EXPERIMENT NO. 3

In Experiment No. 3, a graphite, and more particulately, Brazilian graphite, IBA No. 6, was dispersed on, and then rolled, on the surface of the working electrode to, in turn, result in a surface having a substantially "non-continuous" electronically conductive graphite layer thereon. The potential difference between the working electrode and the reference electrode was measured to be less than 20 mV. The working electrode was cathodically treated with a 0.2 mA current. The change of interfacial resistance of this non-continuously coated surface, over a period of time, was observed and recorded in Table I (hereinabove) under the column identified as "Li Coated with IBA graphite."

EXPERIMENT NO. 4

In Experiment No. 4, and as previously explained, the electrolyte was changed to 1.0M LiClO$_4$ in propylene carbonate. In this particular experiment, the working electrode was not treated/coated with any type of electronically conductive particulate. As was done in Experiment No. 1, a cathodic current of 0.2 mA was applied to the cell for 60 minutes, and, the interfacial resistance of the lithium working electrode, over a period of time, was observed and recorded in Table II (hereinbelow) under the column identified as "Non-treated Li."

TABLE II

In Electrolyte of propylene caronate with 1 M LiclO$_4$ salt.

Ratio of interfacial resistance
(interfacial resistance/initial interfacial resistance of Li)

| Aging Time/hr | Non-treated Li | Coated with carbon from PPP | Coated with Lonza graphite | Coated with carbon black | Treated with Mg powder |
|---|---|---|---|---|---|
| 0 | 1.00 | 0.27 | 0.27 | 0.27 | 0.79 |
| 1 | 1.28 | 0.37 | 0.37 | 0.45 | 0.96 |
| 6 | 1.55 | 0.92 | 0.57 | 0.69 | |
| 16 | 1.39 | 1.04 | 0.62 | 0.73 | 0,98 |
| 24 | 1.32 | 1.00 | 0.62 | 0.71 | 1.14 |
| 49 | | 0.97 | | 0.59 | 1.36 |
| 72 | 1.80 | 1.00 | 0.64 | 0.59 | 1.55 |
| 96 | 1.89 | 1.06 | 0.67 | | 1.67 |
| 120 | 1.96 | 1.17 | 0.70 | 0.59 | 1.78 |

EXPERIMENT NO. 5

With respect to Experiment No. 5, as well as Experiment Nos. 6 through 8, the respective surfaces of the corresponding working electrodes were treated with substantially "non-continuous" electronically conductive particulate coatings. Indeed, as will be observed, such non-continuously applied particulate coatings resulted in working electrodes having lower, and, in some cases, significantly lower, interfacial resistance over the measured period of time.

In particular, and with respect to Experiment No. 5, the surface of the working electrode was treated with a non-continuous electronically conductive particulate coating of carbon from PPP. The potential difference between the working electrode and the reference electrode was measured to be less than 20 mV. The change of interfacial resistance of this substantially non-continuously (interrupted) coated surface, over a period of time, was observed and recorded in Table II (hereinabove) in the column identified as "Coated with carbon from PPP."

EXPERIMENT NO. 6

In Experiment No. 6, the surface of the working electrode was prepared by suspending graphite (Lonza, 6 micro), or acetylene carbon black (Chevron 100% compressed), in hexane (Aldrich) followed by spraying the mixture on the surface with approximately 0.2 mg graphite (or alternatively carbon black), per square centimeter of the lithium surface. The solvent was then evaporated under vacuum and the potential difference between the working electrode and the reference electrode was measured to be less than 20 mV. The change of interfacial resistance of this substantially non-continuously coated surface, over a period of time, was observed and recorded Table II (hereinabove) in the columns identified as "Coated with Lonza graphite" and "Coated with carbon black."

EXPERIMENT NO. 7

In Experiment No. 7, the surface of the working electrode was prepared by dispersing magnesium powder (having a particle size larger than 100 mesh, Alfa) on the lithium surface followed by a rolling procedure. The potential difference between the working electrode and the reference electrode was measured to be less than 20 mV. The change of interfacial resistance of this substantially non-continuously coated surface, over a period of time, was observed and recorded in Table II (hereinabove) under the column identified as "Treated with Mg powder."

EXPERIMENT NO. 8

In Experiment Nos. 8 through 10, an electrochemical cell was assembled wherein the cell included the following common characteristics:

a composite cathode was made from $V_2O_5$(75% wt), EPDM binder (3% wt), graphite and carbon black (Chevron 100% compressed);

a gel electrolyte based on PC-acrylates-$LiAsF_6$; and a metallic lithium anode.

Specifically, with respect to Experiment No. 8, the lithium anode was not treated with any electronically conductive particulate layers. Furthermore, in this experiment, as well as in Experiment Nos. 9 and 10, the effective area of the electrochemical cell was 20 $cm^2$; the open circuit voltage of the cell was measured at approximately 3.50 V; and, the internal impedance of the cell was measured by AC impedance at different aging times. With respect to Experiment No. 8, the change of the cell resistance, over a period of time, was observed and recorded in Table III (hereinbelow) under the column identified as "Non-treated Li."

EXPERIMENT NO. 9

In Experiment No. 9, the anode was treated with a substantially non-continuous coating of graphite or, alternatively, carbon black. The change of the cell resistance, over a period of time, was observed and recorded in Table III (hereinabove) under the columns identified as "Graphite-treated Li" and "Carbon black-treated Li."

EXPERIMENT NO. 10

In Experiment No. 10, the anode was treated with copper mesh rolled on to the surface of the anode in a substantially non-continuous orientation. The change of cell resistance, over a period of time, was observed and recorded in Table III (hereinabove) under the column identified as "Treated with copper mesh."

As previously explained, and as exhibited in Experiment Nos. 2 through 10, the utilization of a substantially non-continuous electronically conductive particulate, when applied to the surface of an electrode, such as a lithium anode, in, for example, a rechargeable battery, served as the impetus toward lowering and substantially sustaining interfacial resistance at the anode, when compared against non-treated electrodes, as well as electrodes treated with a substantially continuous layer of an electronically conductive material. Furthermore, the use of such a non-continuous electronically conductive particulate coating also demonstrated the ability to provoke the formation of a substantially stable passivating layer at the surface of the anode to, in turn, substantially suppress dendritic growth at the interface.

While preferred embodiments have been explained with respect to applications of the particulate coating relative to the anode, it will be understood that such a non-continuous electronically conductive coating can be applied to cathodes as well.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. An electrolytic cell comprising:

two electrodes and an electrolyte wherein one of the two electrodes includes an anode having a surface associated with the electrolyte;

means for substantially minimizing and sustaining interfacial resistance of the anode during the life of the electrolytic cell;

electronically conductive particulate;

the interfacial resistance means including means for hindering ionic transfer through the electronically conductive particulate, the ionic transfer hindering means comprising the electronically conductive particulate being applied to the surface of the anode in a spaced apart, interrupted, orientation.

2. The electrolytic cell according to claim 1 wherein the electronically conductive particulate includes carbon.

3. The electrolytic cell according to claim 1 wherein the anode is constructed from lithium.

TABLE III

Cell resistance of Li anode/PC gel electrolyte/V2O5 cathode

| Aging Time/hr | Cell Resistance/Ω | | | |
|---|---|---|---|---|
| | Non-treated Li | Graphite-treated Li | Carbon black-treated Li | Treated with copper mesh |
| 0 | 11.8 | 0.50 | 0.12 | 15 |
| 100 | 51.3 | 0.60 | 0.22 | 35 |

4. The electrolytic cell according to claim 4 further comprising means to substantially suppress dendritic growth at the anode during electrodeposition.

5. The electrolytic cell according to claim 4 wherein the means to substantially suppress dendritic growth includes a substantially stable passivating layer associated with the anode.

6. The electrolytic cell according to claim 4 wherein the means to substantially suppress dendritic growth includes a surface layer applied to the anode,
  the surface layer includes a copolymer which enables transfer of ions from the anode to the electrolyte and back into contact with the electrode, and, which is electronically conductive when it is in contact with the electrode.

7. The electrolytic cell according to claim 6 wherein the copolymer further includes means for substantially obtaining chemical equilibrium between the surface layer and the electrode.

8. The electrolytic cell according to claim 7 wherein the anode is constructed from lithium.

9. The invention according to claim 1 wherein the electrolytic cell comprises a rechargeable battery.

10. An electrolytic cell comprising:
  two electrodes and an electrolyte wherein one of the electrodes includes an anode having a surface associated with the electrolyte; and
  means for provoking formation of a substantially stable passivating layer at the surface of the anode so as to substantially prevent further passivation of the anode and, in turn, to substantially suppress dendritic growth at the electrode during electrodeposition
  the stable passivating layer provoking means includes an electronically conductive particulate associated with at least a portion of the surface of the anode in a spaced apart, interrupted orientation.

11. The electrolytic cell according to claim 10 wherein the electronically conductive particulate includes carbon.

12. The electrolytic cell according to claim 10 wherein the anode is constructed from lithium.

13. The electrolytic cell according to claim 10 further comprising means for substantially minimizing and sustaining interfacial resistance of the anode during the life of the electrolytic cell.

14. The electrolytic cell according to claim 13 wherein the interfacial resistance means comprises the electronically conductive particulate applied to at least a portion of the surface of the anode in a spaced apart, interrupted orientation.

15. The electrolytic cell according to claim 14 wherein the electronically conductive particulate includes carbon.

16. The invention according to claim 10 wherein the electrolytic cell comprises a rechargeable battery.

17. An electrolytic process comprising the steps of:
  connecting two electrodes separated and positioned within an electrolyte,
  at least one of the two electrodes being an anode substantially constructed from an alkali metal,
  the anode has a surface having an electronically conductive particulate applied thereto in spaced apart, interrupted orientation;
  ionizing metal atoms from the alkali metal anode to provide alkali metal ions;
  transferring ions from the alkali metal anode substantially between the electronically conductive particulate, and, in turn, through the interrupted portions thereof so as to substantially preclude chemical alteration of the alkali metal anode to an electrode which comprises the alkali metal and the substance of the electronically conductive particulate which would otherwise result during electrodeposition to, in turn, sustain substantially low interfacial resistance during the life of the electrolytic cell.

18. The electrolytic process according to claim 17 further including the step of provoking formation of a substantially stable passivating layer to prevent further passivation at the anode, and, in turn, to substantially suppress dendritic growth at the anode during electrodeposition.

19. A process for constructing an electrolytic cell comprising the steps of:
  applying an electronically conductive particulate onto an electrode in a spaced part, interrupted orientation;
  connecting the coated electrode with another electrode and separating both of the electrodes within an electrolyte; and
  forming a stable passivating layer at the anode.

20. The process according to claim 19 further including the step of applying a surface layer onto the electrode coated with the electronically conductive particulate;
  the surface layer being electronically conductive and ionically conductive.

21. The process according to claim 20 wherein the surface layer comprises means for enabling chemical equilibrium between the surface layer and the electrode to which it is applied.

* * * * *

UNITED STATES PATENT AND TRADEMARK OFFICE
CERTIFICATE OF CORRECTION

PATENT NO. : 5,503,946
DATED : April 2, 1996
INVENTOR(S) : Fauteux et al.

It is certified that error appears in the above-indentified patent and that said Letters Patent is hereby corrected as shown below:

| | |
|---|---|
| Col. 3 line 49 | passivating layer 12 should be -- passivating layer 14 --. |
| Col. 6 Table I, 4th Column | 3.95 should be -- 3.85 --. |
| Col. 7 Table I, 3rd. Column | 7.17 should be -- 2.17 --. |
| Col. 7-8 Table II | |
| 1st. Column | 49 should be -- 48 --. |
| 3rd. Column | 0.92 should be -- 0.82 --. |
| 5th Column | 0.69 should be -- 0.68 --. |
| 5th Column | the 2nd. 0.59 should be -- 0.58 --. |
| 6th Column | 0,98 should be -- 0.98 --. |
| Col. 9-10 Table III, 3rd. Column | 0.60 should be -- 0.66 --. |
| Col. 11 line 1 | Claim 4 should be -- Claim 1 --. |
| Col. 12 line 11 | After in insert -- a --. |

Signed and Sealed this

Twentieth Day of August, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,503,946
DATED : April 2, 1996
INVENTOR(S) : Fauteux et al.

It is certified that error appears in the above-indentified patent and that said Letters Patent is hereby corrected as shown below:

Col. 1, line 4          After the title and before the Background insert -- The invention was made with Government support under contract number 93-F151600-000 awarded by the Central Intelligence Agency --.

Signed and Sealed this

Fifth Day of August, 1997

Attest:

BRUCE LEHMAN

*Attesting Officer*      *Commissioner of Patents and Trademarks*